United States Patent Office 3,050,380
Patented Aug. 21, 1962

3,050,380
METHOD AND PRODUCT FOR SUPPRESSING THE NITRIFICATION OF AMMONIUM NITROGEN IN SOIL
Cleve A. I. Goring, Garden Grove, Calif., assignor to The Dow Chemical Company, Midland, Mich., a corporation of Delaware
No Drawing. Filed Apr. 16, 1957, Ser. No. 653,061
13 Claims. (Cl. 71—1)

The present invention relates to crop culture and is particularly concerned with a new agronomical practice and composition for conserving soil nitrogen and for supplying the soil nitrogen requirements for plant nutrition.

Since the majority of plants obtain most or all of their nitrogen requirements from the soil, the adequate provision of nutrient nitrogen in soil for plant growth is one of the foremost agronomic problems. The nitrogen in the soil is found to occur primarily in three forms: organic nitrogen, ammonium nitrogen and nitrate nitrogen, of which ammonium nitrogen and nitrate nitrogen are the primary forms utilized by plants. This nitrogen is absorbed by plants in solution from the soil in the form of ammonium ions and nitrate ions.

The organic nitrogen in the soil consists of a large number of compounds and originates from manure, crop residues, organic fertilizers or bacterial syntheses. Since with the exception of the organic reduced nitrogen fertilizers such as urea, the solubility of these compounds in water is very low, they are not readily leached from the soil, but neither are they directly available to the plants for use. In order to be available to the plants, the nitrogen in the organic compounds must be converted by soil bacteria to ammonia or inorganic ammonium salts. This conversion, when from organic reduced nitrogen fertilizers such as urea, takes place very rapidly, but very slowly when from other organic nitrogen compounds. Following the conversion, the ammonium nitrogen is very rapidly oxidized by soil bacteria to inorganic nitrate nitrogen. In this process, the ammonium nitrogen is first oxidized to the intermediate nitrite nitrogen which is then rapidly oxidized to nitrate nitrogen. This mineralization of organic nitrogen constantly replenishes the soil with nitrogen available for plant absorption.

The ammonium nitrogen in the soil is derived from bacterial conversion of organic nitrogen or from the added reduced nitrogen fertilizers such as anhydrous ammonia, aqueous ammonia, ammonium phosphate, ammonium nitrate and ammonium sulfate. These ammonium compounds or inorganic reduced nitrogen compounds are readily soluble in water or aqueous soil medium. When in solution, the reduced nitrogen occurs largely as the ammonium ion. Due to the cationic nature of this ion, the ion is strongly adsorbed on the soil colloids or base exchange complex of the soil. This colloidal-bound ammonium nitrogen exists in equilibrium with a small concentration of ammonium ions in the soil solution. Thus, the colloidal-bound ammonium nitrogen provides a dynamic nitrogen reservoir to maintain a supply of ammonium ions in the soil solution for plant adsorption. Further, since the ammonium nitrogen in the soil occurs principally as colloidal-bound nitrogen, only very small quantities of the ammonium form of soil nitrogen are lost from the feeding zone of the plants by leaching.

The nitrate nitrogen in the soil is derived from the oxidation or nitrification of ammonium nitrogen by soil bacteria, or by the addition of inorganic nitrate fertilizers such as ammonium nitrate, sodium nitrate, potassium nitrate and calcium nitrate. The inorganic nitrate compounds are readily soluble in water and the aqueous soil medium. When so dissolved, the nitrate nitrogen largely exists as the nitrate ion. Because of the anionic nature of this ion, nitrate nitrogen is not absorbed by soil colloids. Accordingly, the nitrate nitrogen is rapidly leached by rainfall and irrigation and readily lost from the feeding zone of the plants. Further, the nitrate nitrogen is reduced by many soil bacteria to nitrogen gas. The latter process is known as denitrification and accounts for an additional loss of large quantities of nitrate nitrogen from the soil. The yearly loss from leaching and denitrification amounts to from 20 to 80 percent of the nitrate nitrogen found in the soil, whatever its source.

Nitrification or the conversion of the ammonium nitrogen in soil to nitrate nitrogen by bacterial action occurs at a rate which is dependent primarily upon the soil temperature and the soil pH. The rate is also somewhat dependent upon the type of soil and the moisture content of the soil. The rate of nitrification is rapid when the soil temperature is at least 10° C. and the soil pH is at least 5. For example, the conversion of ammonium nitrogen to nitrate nitrogen in sand, silt or clay loam soil having a pH of at least 6 may take place at a rate of from 20 pounds of nitrate nitrogen per acre per week at 10° C., to 500 pounds of nitrate nitrogen per acre per week at 35° C. Even at temperatures as low as 2° C., nitrification will oftentimes occur in such soils at a rate of 25 pounds of nitrate nitrogen per month. Thus, ammonium nitrogen is very rapidly changed to nitrate nitrogen in most agricultural soils.

The tremendous losses of soil nitrogen resulting from the rapid nitrification of ammonium nitrogen, and the leaching and bacterial decomposition of nitrate nitrogen have depleted many agricultural soils of the nitrogen reserves and nitrogen requirements for plant nutrition. In order to replenish the soil nitrogen, the agriculturalist has resorted to the use of large amounts of nitrate fertilizers and reduced nitrogen fertilizers. In many instances, multiple fertilizer treatments, during the growing season have been required to maintain adequate nitrogen requirements for plant growth. In this practice, the greater proportion of the employed fertilizers is in the form of reduced nitrogen fertilizers. By the expression "reduced nitrogen fertilizers" is meant fertilizers containing nitrogen in the reduced state and is inclusive of ammonium salts, ammonia, and water-soluble organic compounds readily convertible in soil to ammonia or ammonium ions such as urea and cyanamide.

Since the nitrogen must be present as nitrate nitrogen before substantial quantities can be leached from the soil or lost by denitrification, the application of nitrogen as reduced nitrogen fertilizers provides the agriculturalist with a short interval during which available reduced nitrogen is at a maximum and conditions for leaching and denitrification are at a minimum. This interval is particularly advantageous during the initial growth of seeds and emerging seedlings when high soil nitrogen concentrations are very desirable. In addition, the ammonium nitrogen absorbed by plants is immediately available for assimilation into organic materials being synthesized thereby. In contrast, the nitrate nitrogen must be reduced before it can be assimilated in the synthesis of plant materials. This reduction is carried out in the plant usually at the expense of synthesized carbohydrate. Although some plants seem to do well on either ammonium nitrogen or nitrate nitrogen as a source of nitrogen nutrients, many plants such as potato, corn, rice, buckwheat, pineapple, cotton and orange prefer ammonium nitrogen and appear to grow best in the presence of substantial amounts of this form of nitrogen.

Thus, the need for a method of suppressing the rapid loss of soil nitrogen is well recognized by agriculturalists.

An object of the present invention is to provide a new and improved agronomic practice for conserving soil nitrogen. A further object is the provision of a new and improved method for suppressing the loss of soil nitrogen. An additional object is the provision of a new and improved method for suppressing the loss of ammonium nitrogen from soil. Another object is the provision of a new and improved method for supplying soil with nitrogen available for plant growth. Another object is the provision of a new and improved method for suppressing the loss of reduced nitrogen fertilizer supplements from the soil. An additional object is the provision of a new and improved method for suppressing the nitrification of ammonium nitrogen in soil. Another object is the provision of a new and improved method for suppressing the conversion in soil of ammonium ions to nitrate ions. An additional object is the provision of novel compositions to be employed in the new methods of the present invention. Other objects will become apparent from the following specification and claims.

The new agronomical practice for improving plant nutrition and conserving soil nitrogen comprises treating plant growth media with a nitroaniline compound comprising (1) nitroanilines having the formula

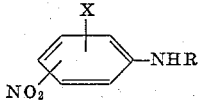

wherein X represents hydrogen, chlorine or methyl and R represents methyl or hydrogen; and (2) salts of said nitroanilines. Suitable salts include hydrochlorides, hydrobromides, nitrates, sulfates, phosphates and oxalates. The nitroaniline compounds are solid materials which are adapted to be readily and conveniently distributed in soil.

By the practice of this invention, the nitrification of ammonium nitrogen in the soil to nitrate nitrogen is suppressed thereby preventing the rapid loss of ammonium nitrogen from the soil. Furthermore, by proper distribution, this action of inhibiting the transformation of ammonium nitrogen to nitrate nitrogen is effective over a prolonged period of time. The ammonium nitrogen may arise from added ammonium nitrogen fertilizers or be formed in the soil by conversion of the organic nitrogen constituents found in soil or added thereto as components of organic fertilizers.

The provision of an effective dosage of the nitroaniline compounds in the soil or growth medium is essential for the practice of the present invention. In general, good results are obtained when the growth medium is modified with the nitroaniline compound in the amount of from 2 to 150 parts or more by weight of the latter per million parts by weight of growth medium. In field applications, the compounds may be distributed in the soil in the amount of at least 0.5 pound per acre and through such a cross-section of the soil as to provide for the presence therein of an effective concentration of the agent. It is usually preferred that the nitroaniline compound be distributed to a depth of at least two inches below the soil surface and at a dosage of at least 0.7 pound per acre inch of soil. By dispersing very large dosages in growth media, a prolonged inhibition of nitrification may be obtained over a period of many months. The concentration of the active nitroaniline compound is eventually reduced to a minimum by decomposition in the soil.

In one embodiment of the present invention, the nitroaniline compound is distributed throughout the growth media prior to seeding or transplanting the desired crop plant.

In another embodiment, the soil in the root zone of growing plants is treated with the active nitroaniline compound in an amount effective to inhibit nitrification but sublethal to plant growth. In such operations, the compounds should be supplied in the soil in an amount no greater than about 50 parts by weight per million parts by weight of the soil. By following such practice, no adverse effect is exerted by the nitroaniline compound upon growth of seeds or plants. Oftentimes it is desirable to treat the soil adjacent to plants, and this procedure may be carried out conveniently in side-dressing operations.

In a further embodiment, soil may be treated with the nitroaniline compound following harvest or after fallowing to prevent rapid loss of ammonium nitrogen and to build up the ammonium nitrogen formed by conversion of organic nitrogen compounds. Such practice conserves the soil nitrogen for the following season.

In an additional embodiment, the soil is treated with the nitroaniline compound in conjunction with the application of reduced nitrogen fertilizers. The treatment with the nitroaniline compound may be carried out prior to, subsequent to or simultaneously with the application of fertilizers. Such practice prevents the rapid loss of the ammonium nitrogen added as fertilizer and the ammonium nitrogen formed from the organic reduced nitrogen in fertilizers by the action of soil bacteria. The administration to the soil of the nitroaniline compound as a constituent of an ammonium nitrogen fertilizer composition constitutes a preferred embodiment of the present invention.

The present invention may be carried out by distributing the nitroaniline compound in an unmodified form through growth medium. The present method also embraces distributing the compound as a constituent in liquid or finely divided solid compositions. In such practice, the nitroaniline compound may be modified with one or more additaments or soil treating adjuvants including water, petroleum distillates or other liquid carriers, surface-active dispersing agents, finely divided inert solids and nitrogen fertilizers. Depending upon the concentration of the nitroaniline compound, such augmented compositions may be distributed in the soil without further modification or be considered concentrates and subsequently diluted with additional inert carrier to produce the ultimate treating compositions. The required amount of the nitroaniline compound may be supplied to growth media in from 1 to 50 gallons of organic solvent carrier, in from 5 to 27,000 or more gallons of aqueous carrier, or in from about 20 to 2,000 pounds of solid carrier per acre treated. When the compound is dispersed in an organic solvent carrier, it may be further dispersed in the above volume of aqueous liquid carrier.

The concentration of the compounds in compositions to be employed for the treatment of growth media is not critical and may vary considerably provided the required dosage of effective agent is supplied to the growth media. The concentration of the nitroaniline compound may vary from 0.001 percent by weight to 95 percent by weight of the composition, depending on whether the composition is a treating composition or a concentrate composition and whether it is in the form of a solid or a liquid. In aqueous liquid treating compositions, concentrations of from 0.001 percent to 0.25 percent by weight of the nitroaniline compound is considered the preferred composition. The concentration of the nitroaniline compound in organic solvents may be from 2.0 to 50 percent by weight. Concentrate liquid compositions generally contain from 2.5 to 50 percent by weight of the nitroaniline compound. Solid compositions may contain the nitroaniline compound in amounts as high as 95 percent by weight of the active compound. Treating compositions generally contain 0.004 percent to 10 percent by weight of the nitroaniline compound. Concentrate compositions oftentimes may contain from 2.5 to 95 percent of the nitroaniline compound.

Liquid compositions containing the desired amount of the nitroaniline compound may be prepared by dispersing the latter in one or more liquid carriers such as water or an organic solvent with or without the aid of a suitable surface-active dispersing agent or emulsifying agent.

Suitable organic solvents include acetone, diisobutylketone, methanol, ethanol, isopropyl alcohol, diethyl ether, toluene, methylene chloride, chlorobenzene and the petroleum distillates. The preferred organic solvents are those which are of such volatility that they leave little permanent residue in the soil. When the solutions of nitroaniline compound in organic solvents are to be further diluted to produce aqueous dispersions, the preferred solvents include acetone and the alcohols. When the liquid carrier is entirely organic in nature, particularly desirable carriers are the petroleum distillates boiling almost entirely under 400° F. at atmospheric pressure and having a flash point above about 80° F. Dispersing and emulsifying agents which may be employed in liquid compositions include condensation products of alkylene oxides with phenols and organic acids, alkyl aryl sulfonates, polyoxyalkylene derivatives of sorbitan esters, complex ether alcohols, mahogany soaps and the like. The surface-active agents are generally employed in the amount of from 1 to 20 percent by weight of the nitroaniline compound.

Solid compositions containing the active nitroaniline compound may be prepared by dispersing the latter in finely divided inert solid carriers such as talc, chalk, gypsum, vermiculite, bentonite and the like, fuller's earth, attapulgite and other clays, various solid detergent dispersing agents and solid fertilizer compositions. In preparing such compositions, the carrier is mechanically ground with the nitroaniline compound or wet with a solution or dispersion thereof in a volatile organic solvent. Depending upon the proportions of ingredients, these compositions may be employed without further modification or be considered concentrates and subsequently further diluted with solid surface-active dispersing agent, talc, chalk, gypsum or the like to obtain the desired treating composition. Furthermore, such concentrate compositions may be dispersed in water with or without added dispersing agent or agents to prepare aqueous soil treating compositions.

Soil treatment compositions may be prepared by dispersing the nitroaniline compounds in fertilizers such as ammonium fertilizer or organic nitrogen fertilizer. The resulting fertilizer composition may be employed as such or may be modified such as by dilution with additional nitrogen fertilizer or with inert solid carrier to obtain a composition containing the desired amount of nitroaniline compound for treatment of soil. Further, an aqueous dispersion of the nitroaniline compound fertilizer composition may be prepared and administered to the growth medium. Fertilizer compositions comprising the nitroaniline compound in intimate admixture with ammonium fertilizers constitute preferred embodiments of the present invention.

In fertilizer compositions comprising a reduced nitrogen fertilizer, it is desirable that the nitroaniline compound be present in an amount of at least 0.5 percent by weight based on the weight of the nitrogen present in the fertilizer as reduced nitrogen. Thus, when a fertilizer composition contains both reduced nitrogen and other forms of nitrogen such as in the cse of ammonium nitrate fertilizer compositions, the amount is based on the weight of nitrogen present in the ammonium component.

In operations carried out in accordance with the present invention, the soil may be impregnated in any convenient fashion with the nitroaniline compound or a composition containing the latter. For example, these modified or unmodified compositions may be mechanically mixed with the soil, applied to the surface of soil and thereafter dragged or disced into the soil to a desired depth; or transported into the soil with a liquid carrier such as by injection spraying or irrigation. When the distribution is carried out by introducing the nitroaniline compound in the water employed to irrigate the soil, the amount of water is varied in accordance with the moisture content of the soil in order to obtain a distribution of the nitroaniline compound to the desired depth.

The nitronaniline compound may be readily and conveniently distributed to a depth of from two to four feet by irrigation methods. The preferred methods embrace prodcedures using any of these steps or combination of steps wherein the compounds are distributed in the soil substantially simultaneously with a reduced nitrogen fertilizer.

The following examples illustrate the invention but are not to be construed as limiting.

EXAMPLE 1

An aqueous ammonium fertilizer composition containing 1,000 parts by weight of nitrogen and 50 parts by weight of m-nitroaniline per million parts of aqueous medium was prepared by dispersing a 4 percent (weight by volume of solvent) acetone solution of m-nitroaniline in aqueous ammonium sulfate solution. (The amount of nitrogen in all examples is based on the nitrogen present in the fertilizer in the reduced form.)

The composition so prepared was employed to treat seed beds prepared from sandy loam soil having a pH of about 8, containing essentially no organic material and having been freed of nitrite and nitrate nitrogen by prior thorough leaching with water. In the treating operation, the composition was applied to the seed beds as a soil drench, and the soil in the beds thoroughly mixed to insure a substantially uniform distribution of the composition throughout the soil. The amount of composition employed was sufficient to supply 200 parts by weight of nitrogen and 10 parts by weight of m-nitroaniline per million parts by weight of soil. In a check operation, other seed beds prepared of soil also freed of nitrite and nitrate nitrogen, containing substantially no organic material and having a pH of 8 were fertilized with a similar aqueous fertilizer composition containing the same amount of acetone and ammonium sulfate but no aniline compound. The composition was applied in an amout sufficient to supply the same concentration of nitrogen to the soil as the treating composition containing m-nitroaniline. The soil temperature of all seed beds was maintained at about 70° F. for the period of the determination.

At various intervals following treatment, samples of soil were taken from the different seed beds and the extent of nitrification of the added ammonium sulfate fertilizer determined by analyses for combined nitrate plus nitrite nitrogen. The determinations were carried out by extracting the nitrate and nitrite from the soil with a saturated calcium sulfate solution, developing color in the clear supernatant of the extract with diphenylamine in sulfuric acid and comparing the color with a standard solution containing known concentrations of nitrate and nitrite ions. This procedure is similar to that described in "Colorimetric Methods of Analysis" by F. D. Snell and C. T. Snell, D. Van Norstrand Company, Inc., volume II, 3rd edition, page 801.

The percent nitrification in the seed beds of the added ammonium sulfate at various intervals is set forth in the following table:

*Table I*

| Interval Following Treatment in Days | Percent Nitrification | |
|---|---|---|
| | Soil Treated with Ammonium Sulfate + m-Nitroaniline | Soil Treated with Ammonium Sulfate (Check) |
| 7 | 5 | 100 |
| 23 | 5 | 100 |
| 37 | 10 | 100 |
| 72 | 25 | 100 |

EXAMPLE 2

An experiment was carried out in a manner similar to that described in Example 1 but employing a composition wherein o-nitroaniline was substituted for m-nitroaniline and wherein the concentrations of the nitrogen fertilizer and aniline compound were reduced. An aqueous ammonium fertilizer composition containing 500 parts by weight of nitrogen and 25 parts by weight of o-nitroaniline per million parts of aqueous medium was prepared by dispersing a 2 percent (weight by volume of solvent) acetone solution of o-nitroaniline in aqueous ammonium sulfate solution. The composition was applied to soil in seed beds in an amount sufficient to give a concentration therein of 100 parts by weight of nitrogen and 5 parts by weight of o-nitroaniline per million parts by weight of soil. The degree of nitrification was determined after intervals of 7 days and 13 days and was found to be 0 percent and 5 percent, respectively. A check operation carried out with a composition containing no o-nitroaniline showed 100 percent nitrification at both intervals.

EXAMPLE 3

Ammonium sulfate and an acetone solution containing 2 percent (weight by volume of solvent) of 2-chloro-4-nitroaniline were dispersed in water to prepare an aqueous composition containing 200 parts by weight of nitrogen and 50 parts by weight of 2-chloro-4-nitroaniline per million parts by weight of ultimate mixture. This composition was applied to seed beds of sandy loam soil similar to that described in Example 1, in an amount sufficient to provide 40 parts by weight of nitrogen and 10 parts by weight of 2-chloro-4-nitroaniline per million parts by weight of soil. A check operation was simultaneously carried out on other seed beds employing a similar aqueous fertilizer composition containing no 2-chloro-4-nitroaniline.

At various intervals following treatment, analyses were made on samples of soil from the different seed beds for their content of nitrite plus nitrate nitrogen and the percent nitrification of amonium sulfate determined thereby. The percentage nitrification at various intervals is given in the following table:

*Table II*

| Interval Following Treatment in Days | Percent Nitrification | |
|---|---|---|
| | Soil Treated with Ammonium Sulfate + 2-Chloro-4-nitroaniline | Soil Treated with Ammonium Sulfate (Check) |
| 7 | 0 | 100 |
| 13 | 0 | 100 |
| 20 | 0 | 100 |
| 27 | 12 | 100 |
| 33 | 25 | 100 |

EXAMPLE 4

An aqueous ammonium sulfate composition containing 200 parts by weight of nitrogen and 50 parts by weight of 4-chloro-2-nitroaniline per million parts by weight of ultimate mixture was prepared in a manner similar to that described in Example 3. This composition was applied to sandy loam soil in an amount sufficient to provide 40 parts by weight of nitrogen and 10 parts by weight of 4-chloro-2-nitroaniline per million parts by weight of soil. A check operation was carried out simultaneously on other seed beds employing a similar aqueous fertilizer composition wherein the 4-chloro-2-nitroaniline was omitted.

At intervals following the treatment, samples of soil from the different seed beds were analyzed for their content of nitrite plus nitrate nitrogen and the percent nitrification of ammonium sulfate determined. The results are given in Table III.

*Table III*

| Interval Following Treatment in Days | Percent Nitrification | |
|---|---|---|
| | Soil Treated with Ammonium Sulfate + 2-Chloro-4-nitroaniline | Soil Treated with Ammonium Sulfate (Check) |
| 7 | 0 | 100 |
| 13 | 0 | 100 |
| 20 | 12 | 100 |

EXAMPLE 5

Concentrate compositions are prepared as follows:
(A) 25 parts by weight of N-methyl-p-nitroaniline, 65 parts of xylene and 10 parts of an alkylated aryl polyether alcohol (Triton X–100) are mechanically mixed together to obtain an emulsifiable liquid composition.
(B) 90 parts by weight of 5-nitro-o-toluidine and 10 parts of an alkyl aryl sulfonate (Acto 700) are mechanically mixed together to obtain a water-dispersible mixture.

These compositions may be dispersed in water to produce aqueous compositions having desirable wetting and penetrating properties. These aqueous compositons are then employed to treat soil in an amount sufficient to distribute the nitroaniline compound therein in effective concentrations. The concentrates may also be dispersed in aqua ammonia to prepare fertilizer compositions.

EXAMPLE 6

Fertilizer compositions are prepared as follows:
(A) Monosulfate and monophosphate salts of 2-chloro-5-nitroaniline are mechanically mixed in separtae portions with diammonium phosphate to prepare reduced nitrogen fertilizer compositions containing 5 percent by weight of a 2-chloro-5-nitroaniline salt.
(B) Nitrate salt of N-methyl-3-nitro-p-toluidine is mechanically mixed in separate portions with ammonium nitrate to prepare reduced nitrogen fertilizer compositions containing 3 percent by weight of N-methyl-3-nitro-p-toluidine salt.
(C) Hydrochloride and hydrobromide salts of N-methyl-4-chloro-3-nitroaniline are mechanically mixed in separate portions with urea to prepare reduced nitrogen fertilizer compositions containing 2 percent by weight of an N-methyl-4-chloro-3-nitroaniline salt.

These fertilizer compositions are distributed in soil to supply the nitrogen requirements for plant nutrition. The treated soil is resistant to nitrification and provides nitrogen available for plant growth over a prolonged period of time.

EXAMPLE 7

Aqueous ammonium fertilizer compositions containing 1,000 parts by weight of nitrogen and 50 patrs by weight of o-nitroaniline in a million parts of aqueous media were prepared by dispersing an acetone solution containing 4 percent (weight by volume of solvent) of o-nitroaniline in aqueous solutions of various ammonium compounds.

In operations similar to that described in Example 1, the soil in various seed beds was treated with the above described compositions to distribute a particular composition throughout the soil in an amount sufficient to supply a concentration of nitrogen in the soil of 200 parts by weight and of o-nitroaniline of 10 parts by weight per million parts by weight of soil. The treated soil was maintained at 70° F. for the period of the operation. At various intervals, samples of the soil were taken and analyses made to determine the extent of nitrification.

Soils treated with the ammonium phosphates were analyzed for nitrate plus nitrite nitrogen as previously described. The soils treated with ammonium nitrate were analyzed for residual ammonia by extracting the soil with 2 molar potassium chloride and the ammonia in the extract determined by comparisons with a standard on a spot plate using Nessler's reagent as indicator.

Check operations were simultaneously carried out on other seed beds employing similar aqueous fertilizer composition but containing no m-chloroaniline. The results of the treating and check operations are given in Table IV.

*Table IV*

| Treating Composition | Interval Following Treatment in Days | Percent Nitrification |
|---|---|---|
| Ammonium nitrate + o-nitroaniline | 14 | 0 |
| Ammonium nitrate (check) | 14 | 90 |
| Ammonium nitrate + o-nitroaniline | 20 | 0 |
| Ammonium nitrate (check) | 20 | 100 |
| Diammonium phosphate + o-nitroaniline | 20 | 5 |
| Diammonium phosphate (check) | 20 | 100 |
| Diammonium phosphate + o-nitroaniline | 40 | 25 |
| Diammonium phosphate (check) | 40 | 100 |
| Monoammonium phosphate + o-nitroaniline | 40 | 20 |
| Monoammonium phosphate (check) | 40 | 100 |
| Monoammonium phosphate + o-nitroaniline | 48 | 38 |
| Monoammonium phosphate (check) | 48 | 100 |

EXAMPLE 8

A solid fertilizer composition is prepared as follows: (1) an inhibitor component is prepared by (a) mixing and grinding together 0.2 gram of 3-nitro-p-toluidine and 0.3 gram of attapulgite, (b) adding 1.5 grams of prophyllite thereto and grinding the resulting mixture until a finely powdered uniform composition is obtained; (2) a fertilizer component is prepared by hammermilling together a 50:50 mixture by weight of ammonium sulfate and pyrophyllite to obtaine a fine uniform composition; (3) the inhibitor component and fertilizer component are mixed together in various ratios on a roller mill to obtain a soil treating composition containing 3-nitro-p-toluidine in varying concentrations expressed in percent based on the nitrogen in the composition. These compositions are employed to fertilize various beds of sandy loam soil containing essentially no organic material and having a pH of about 8. The soil employed is leached prior to use to remove all nitrate and nitrite nitrogen constituents. A sufficient amount of water is added to the various beds to give the soil in the beds varying moisture content. The beds are fertilized in areas to be planted by providing depressions and adding thereto the fertilizer treating composition and then covering the composition with soil. The amount of composition employed is sufficient to supply 160 parts by weight of nitrogen per million parts by weight of soil. The soil is maintained in the temperature range of from 70° to 85° F. for three weeks. At the end of this period, samples of soil are analyzed for content of nitrate + nitrite nitrogen to determine the extent of nitrification of the added ammonium sulfate. When the results are compared with determinations made on a check operation wherein a fertilizer composition containing no 3-nitro-p-toluidine has been employed, it is found that the soil treated with 3-nitro-p-toluidine containing composition contains no substantial amount of nitrate plus nitrite nitrogen and therefore shows little nitrification, whereas the soil treated with the fertilizer composition containing no 3-nitro-p-toluidine shows complete conversion of ammonium nitrogen to nitrate plus nitrite nitrogen or 100 percent nitrification.

EXAMPLE 9

Irrigation water was modified by adding an acetone solution containing 5 percent (weight by volume of solvent) of 2-chloro-4-nitroaniline to give a concentration of the aniline compound therein of 50 parts by weight in a million parts of water.

The water modified as described above was employed to irrigate dry sandy loam soil having a pH of 8 and previously leached to remove any nitrite and nitrate present. The depth of the sandy loam bed was 20-21 inches. An amount of modified water equal to 6 acre inches per acre was added and allowed to equilibrate in the soil by standing for several days. At the end of this period, samples of soil from various depths were taken. To each sample a sufficient volume of an aqueous ammonium sulfate solution containing 2,500 parts of nitrogen by weight per million parts of water was added to give a composition containing 100 parts by weight of nitrogen per million parts of soil. The fertilized soil samples were thereafter maintained in the temperature range of from 70° to 85° F. At periodic intervals, samples of the soil were taken and analyses made on the nitrate plus nitrite nitrogen to determine the extent of nitrification. The results are given in Table V.

*Table V*

| Sample of Soil Taken | Depth in Inches | Percent Nitrification at Indicated Number of Days After Incubation ||||||| 
|---|---|---|---|---|---|---|---|---|
| | | 6 | 17 | 31 | 49 | 56 | 63 | 78 |
| 1 | 0-2 | 0 | 0 | 0 | 0 | 0 | 0 | 0 |
| 2 | 2-4 | 0 | 0 | 0 | 0 | 0 | 0 | 0 |
| 3 | 4-6 | 0 | 0 | 0 | 0 | 0 | 0 | 0 |
| 4 | 6-8 | 0 | 0 | 0 | 0 | 0 | 5 | |
| 5 | 8-10 | 0 | 0 | 0 | | | | |
| 6 | 10-12 | 0 | 0 | 25 | | | | |
| 7 | 16-18 | 0 | 0 | | | | | |

A check operation was carried out by irrigating soil with unmodified water. In determinations made on various layers of soil of the check operation, it was found that after 7 days there was 100 percent nitrification at all depths in the soil.

EXAMPLE 10

An aqueous soil treating composition containing 100 parts by weight of o-nitroaniline, 1,000 parts by weight of nitrogen as ammonium sulfate and 500 parts by weight of phosphorus as phosphoric acid was prepared by dispersing a 4 percent (weight per volume of solvent) acetone solution of o-nitroaniline into an aqueous solution of ammonium sulfate and phoshporic acid.

Pots were prepared for planting with 500 grams of sandy loam soil having a pH of 8 and a 4 percent moisture content. 200 milliliters of the treating composition prepared as described above was poured over the soil in the pots (an amount equal to about 1 inch of liquid) to supply to the soil o-nitroaniline in an amount sufficient to give a concentration of 40 parts by weight per million parts by weight of soil and a concentration of nitrogen of 400 parts per million. The treated soil was then covered with paper to reduce evaporation and maintained in the temperature range of from 70° to 80° F.

After a period of six weeks, the soil in the pots was leached with 6 inches of water and thereafter planted with three species. Each pot was planted with four tomato plants, five milo plants and a thick stand of rye. After an appropriate growth interval, the tops of the plants were harvested just above ground level and weighed. The average fresh weight in grams per pot was determined at the time of harvest which was 35 days for tomato plants, 46 days for milo plants and 47 days for rye plants.

A check operation was carried out simultaneously wherein soil in pots was similarly fertilized with a composition containing the same amount of ammonium sulfate, phosphoric acid and acetone but no o-nitroaniline.

The weights of the plant tops at harvest in both the treating and check operations are set forth in Table VI.

Table VI

| Treating Composition | Weight of Fresh Plant Tops in Grams per Pot | | |
|---|---|---|---|
| | Tomato | Milo | Rye |
| Ammonium sulfate + phosphoric acid + o-nitroaniline + acetone | 23.3 | 27.9 | 13.2 |
| Ammonium sulfate + phosphoric acid + acetone (check) | 6.4 | 7.7 | 4.8 |

EXAMPLE 11

A fertilizer composition was prepared by (1) dissolving 0.2 gram of 2-chloro-4-nitroaniline in 5 milliliters of acetone (2) adding 0.25 milliliter of the acetone solution to 25 milliliters of an aqueous ammonium dihydrogen phosphate fertilizer composition containing 20,000 parts by weight of nitrogen per million parts of aqueous medium.

Pots were prepared for planting by thoroughly mixing the above prepared fertilizer composition with fine sandy loam soil having a pH of 8 and a moisture content of 5 percent in an amount sufficient to give a concentration of 10 parts by weight of the aniline compound and 500 parts by weight of nitrogen per million parts by weight of soil. The treated soil was maintained in a moist atmosphere at 72° F. for three weeks. At the end of this period, the soil was leached with 6 inches of water, dried until the moisture content therein was from 7 to 10 percent. The soil was then planted with 4 tomato plants per pot. After six weeks, phosphoric acid fertilizer was supplied to the soil in the pots in an amount sufficient to supply 200 parts by weight of phosphorus per million parts of soil. Two months after planting, the plants were harvested and the fresh weights of the tops determined.

A check operation was carried out simultaneously wherein the soil was similarly treated before and after planting but wherein the 2-chloro-4-nitroaniline was omitted from the aqueous ammonium fertilizer composition.

The average weight of the plant tops in both treating and check operations are shown in Table VII.

Table VII

| Treating Composition | Weight of Fresh Tomato Plant Tops in Grams per Pot |
|---|---|
| Phosphoric acid + ammonium dihydrogen phosphate + 2-chloro-4-nitroaniline + acetone | 17.8 |
| Phosphoric acid + ammonium dihydrogen phosphate + acetone | 3.5 |

I claim:

1. A method useful for suppressing the nitrification of ammonium nitrogen in soil and preventing rapid loss of ammonium nitrogen therefrom, and improving plant nutrition therein which comprises impregnating soil below the soil surface in the growing area thereof with a nitroaniline compound in an amount of from about 2 to 150 parts by weight per million parts by weight of soil, wherein said nitroaniline compound is selected from the group consisting of (1) nitroanilines having the formula

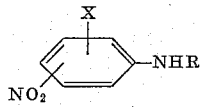

wherein X represents a member of the group consisting of hydrogen, methyl and chlorine, and R represents a member of the group consisting of hydrogen and methyl; and (2) salts of said nitroanilines.

2. A method according to claim 1 wherein the nitroaniline compound is m-nitroaniline.

3. A method according to claim 1 wherein the nitroaniline compound is N-methyl-p-nitroaniline.

4. A method according to claim 1 wherein the nitroaniline compound is o-nitroaniline.

5. A method according to claim 1 wherein the nitroaniline compound is 3-nitro-p-toluidine.

6. A method according to claim 1 wherein the nitroaniline compound is 2-chloro-4-nitroaniline.

7. A method according to claim 1 wherein the nitroaniline compound is added in an amount sufficient to give a concentration in the soil of from 2 to 50 parts by weight per million parts by weight of soil.

8. A method according to claim 7 wherein the nitroaniline compound is introduced in the soil at a point near the roots of the growing plants.

9. A method for treating soil to prevent rapid loss of ammonium nitrogen from soil and to inhibit the conversion therein of ammonium nitrogen to nitrate and nitrite nitrogen which comprises impregnating soil below the soil surface in the growing area thereof in an amount sufficient to inhibit nitrification therein, said amount being sufficient to give a concentration in soil of at least 2 parts by weight per million parts by weight of soil, with a composition comprising a nitroaniline compound in intimate admixture with a soil treating adjuvant, said nitroaniline compound being selected from the group consisting of (1) nitroanilines having the formula

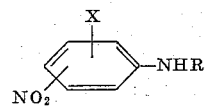

wherein X represents a member of the group consisting of hydrogen, methyl and chlorine, and R represents a member of the group consisting of hydrogen and methyl; and (2) salts of said nitroanilines.

10. A method according to claim 9 wherein the adjuvant is a reduced nitrogen fertilizer composition, said reduced nitrogen fertilizer being a fertilizer containing nitrogen in the reduced state and is selected from the group consisting of ammonium salts, ammonia, urea and cyanamide.

11. In the fertilization of soil with a reduced nitrogen fertilizer, the step which comprises impregnating soil below the soil surface in the growing area thereof substantially simultaneously with the reduced nitrogen fertilizer, a nitroaniline compound in an amount sufficient to suppress the nitrification of ammonium nitrogen in the soil and to prevent rapid loss of said ammonium nitrogen from soil but in an amount sublethal to vegetative growth, said amount being sufficient to give a concentration in the soil of at least 2 parts by weight per million parts by weight of soil; wherein said nitroaniline compound is selected from the group consisting of (1) nitroanilines having the formula

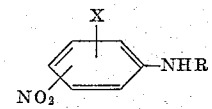

wherein X represents a member of the group consisting of hydrogen, methyl and chlorine, and R represents a member of the group consisting of hydrogen and methyl; and (2) salts of said nitroanilines and wherein said reduced nitrogen fertilizer is a fertilizer containing nitrogen in the reduced state and is selected from the group consisting of ammonium salts, ammonia, urea and cyanamide.

12. A fertilizer composition comprising a major amount of reduced nitrogen fertilizer as source of ammonium ions and not to exceed 95 percent by weight of a nitroaniline compound, wherein said nitroaniline compound is present in a concentration of at least 0.5 percent by weight based on the weight of reduced nitrogen present in the fertilizer, and wherein said nitroaniline compound is selected from the group consisting of (1) nitroanilines having the formula

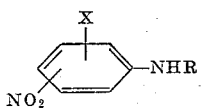

wherein X represents a member of the group consisting of hydrogen, methyl and chlorine, and R represents a member of the group consisting of hydrogen and methyl; and (2) salts of said nitroanilines; and wherein said reduced nitrogen fertilizer is a fertilizer containing nitrogen in the reduced state and is selected from the group consisting of ammonium salts, ammonia, urea and cyanamide.

13. A fertilizer composition comprising a major amount of a reduced nitrogen fertilizer as a source of ammonium ions and not to exceed 95 percent by weight of o-nitroaniline as the nitroaniline compound, wherein said nitroaniline compound is present in a concentration of at least 0.5 percent by weight based on the weight of the reduced nitrogen present in the fertilizer, and wherein said reduced nitrogen fertilizer is a fertilizer containing nitrogen in the reduced state and is selected from the group consisting of ammonium salts, ammonia, urea and cyanamide.

References Cited in the file of this patent
UNITED STATES PATENTS

| | | |
|---|---|---|
| 2,111,879 | Vivian et al. | Mar. 22, 1938 |
| 2,213,215 | Hester | Sept. 3, 1940 |
| 2,294,299 | Hester et al. | Aug. 25, 1942 |
| 2,314,091 | Jones | Mar. 16, 1943 |
| 2,430,721 | Ladd | Nov. 11, 1947 |
| 2,689,789 | Mowry et al. | Sept. 21, 1954 |
| 2,835,565 | Goodhue et al. | May 20, 1958 |